United States Patent

Umetani et al.

[11] Patent Number: 5,880,470
[45] Date of Patent: Mar. 9, 1999

[54] TWO-DIMENSIONAL RADIATION IMAGE DETECTOR

[75] Inventors: Keiji Umetani, Hino; Ken Ueda, Oume; Tetsurou Minemura, Hitachioota; Kazutaka Tsuji, Hachiouji; Koichi Koike, Kashiwa, all of Japan

[73] Assignees: Hitachi, Ltd.; Hitachi Medical Corporation, both of Tokyo, Japan

[21] Appl. No.: 643,746

[22] Filed: May 6, 1996

[30] Foreign Application Priority Data

May 17, 1995 [JP] Japan .................................. 7-118139

[51] Int. Cl.$^6$ ................................ G21K 4/00; G01T 1/24
[52] U.S. Cl. ................................ 250/370.09; 250/370.11; 250/367
[58] Field of Search ................ 250/370.09, 370.11, 250/367, 368, 486.1, 370.1

[56] References Cited

U.S. PATENT DOCUMENTS

| 5,187,369 | 2/1993 | Kingsley et al. |
|---|---|---|
| 5,262,649 | 11/1993 | Antonuk et al. |
| 5,420,429 | 5/1995 | Eberhard et al. .................. 250/370.11 |

FOREIGN PATENT DOCUMENTS

| 429-977 | 6/1991 | European Pat. Off. .......... 250/370.09 |
| 61-62283 | 3/1986 | Japan . |
| 3-189585 | 8/1991 | Japan .............................. 250/370.09 |
| 6-16775 | 3/1994 | Japan . |

Primary Examiner—Edward P. Westin
Assistant Examiner—Richard Hanig
Attorney, Agent, or Firm—Antonelli, Terry, Stout & Kraus, LLP

[57] ABSTRACT

A 2-dimensional radiation image detector wherein a plurality of conversion elements for converting a radiation into visible light and a plurality of photo-sensitive elements for detecting the visible light and accumulating signals are formed an elements board includes two elements boards arranged in an overlapping relationship with each other and each having the plurality of photo-sensitive elements arranged two-dimensionally thereon such that the distance between centers of the photo-sensitive elements in one direction of the arrangement is substantially equal to a width of the photo-sensitive elements while the distance between the centers of the photo-sensitive elements in a direction perpendicular to the one direction is substantially equal to twice the width of the photo-sensitive elements and such that that portion of a radiation directed upon the two overlapping elements boards which has passed through a first one of the elements boards other than locations of the photo-sensitive elements is detected by the photo-sensitive elements of the second elements board.

69 Claims, 11 Drawing Sheets

TWO-DIMENSIONAL RADIATION IMAGE DETECTOR

BACKGROUND OF THE INVENTION

This invention relates to a high-resolution 2-dimensional radiation image detector in the form of a plate of a large area, and more particularly to a 2-dimensional radiation image detector which can be applied not only to an apparatus for diagnosis by a radiation image but also to an apparatus for non-destructive inspection or the like which uses a radiation.

An "X-ray/electric conversion apparatus" disclosed in Japanese Patent Laid-Open Application No. Showa 61-62283 and a "Radiation diagnosis apparatus" disclosed in Japanese Patent Publication Application No. Heisei 6-16775 are known as prior art plate-formed radiation image detectors. Those apparatus have a structure wherein optical detectors formed from amorphous silicon or poly-silicon are arranged two-dimensionally on a plate and a phosphor having an equal area to that of the plate is held in close contact with the plate. The phosphor absorbs and converts a radiation into fluorescence, and the optical detectors arranged two-dimensionally detect the fluorescence and convert an image of the radiation into an electric signal. Meanwhile, an apparatus in the form of a plate for imaging a radiation digital image is disclosed in U.S. Pat. No. 5,262,649 entitled "Thin-film Flat Panel, Pixelated Detector Array for Real-time Digital Imaging and Dosimetry of Ionizing Radiation". A further plate-formed radiation image detector is disclosed in U.S. Pat. No. 5,187,369 entitled "High Sensitivity, High Resolution, Solid State X-ray Imaging Device with Barrier Layer".

SUMMARY OF THE INVENTION

The prior art apparatus have a structure wherein optical detectors are arranged two-dimensionally on a single board and a phosphor layer is formed on the optical detectors. Consequently, the prior art apparatus are disadvantageous in that high-density mounting on an elements board is required and the aperture efficiency at the location of the optical detectors is deteriorated and that designing of a wiring pattern is subject to a significant restriction. It is an object of the present invention to provide a 2-dimensional radiation image detector wherein, eliminating the disadvantages of the prior art apparatus, an increase in sensitivity by remarkable improvement of the aperture efficiency can be achieved without being subject to a restriction from the structure that an image detector is formed on only one board and the limitation to a wiring pattern can be moderated to expand the degree of freedom in designing of an image detector and allow achievement of a further increase in area.

According to the present invention, a 2-dimensional radiation image detector is characterized in that it is composed of a set of two elements boards arranged in an overlapping with each other and each having formed thereon a plurality of conversion elements for converting a radiation into visible light and a plurality of photo-sensitive elements for detecting the visible light and accumulating signals.

In the two-dimensional arrangements of the photo-sensitive elements on each of the elements boards forming the 2-dimensional radiation image detector, the distance between centers of the photo-sensitive elements in one direction of the arrangement is substantially equal to a width of the photo-sensitive elements while the distance between the centers of the photo-sensitive elements in a direction perpendicular to the one direction is substantially equal to twice the width of the photo-sensitive elements.

According to another aspect of the present invention, a 2-dimensional radiation image detector includes a plurality of conversion elements for converting a radiation into visible light, a plurality of photo-sensitive elements for detecting the visible light and accumulating signals, a plurality of switching elements for reading out the signals accumulated in the plurality of photo-sensitive elements, and an elements board on which the conversion elements, the photo-sensitive elements and the switching elements are formed. A plurality of sets of detection pixels each including a photo-sensitive element and a switching element are arranged two-dimensionally on the element board. A region of a substantially one half area of each of the detection pixels in a direction in which the photo-sensitive elements and the switching elements are arranged alternately is formed from a parallel wiring for switching control for controlling a corresponding switching element and a photo-sensitive element.

According to a further aspect of the present invention, a 2-dimensional radiation image detector is characterized in that a plurality of conversion elements for converting a radiation into visible light and a plurality of photo-sensitive elements for detecting the visible light and accumulating signals are formed on an elements board, and that the 2-dimensional radiation image detector includes N such elements boards arranged in an overlapping relationship with each other, N being an integer equal to or greater than 2, such that, when a radiation is directed upon the N elements boards, that portion of the radiation which has passed through an nth one of the elements boards other than the photo-sensitive elements is detected by the photo-sensitive elements on an (n+1)th one of the elements boards, n being an integer satisfying $1 \leq n < N$.

In the construction wherein a plurality of conversion elements for converting a radiation into visible light, a plurality of photo-sensitive elements for detecting the visible light and accumulating signals and a plurality of switching elements for reading out the signals accumulated in the plurality of photo-sensitive elements are arranged two-dimensionally on an elements board, there is a limitation in increase of the aperture efficiency of the photo-sensitive part included in a photo-sensitive element with respect to visible light because of an increase of the mounting density. Therefore, if two elements boards are used to moderate the mounting density, then the aperture efficiency of a photo-sensitive element can be increased remarkably. In this instance, a radiation is detected by the photo-sensitive elements on the first elements board, and that portion of the radiation which is directed upon the other portion of the first elements board than the photo-sensitive elements passes through the first elements board. The thus passing radiation is detected by the photo-sensitive elements on the second elements board.

In the present invention, since two elements boards are used, the size of one pixel formed from a conversion element, a photo-sensitive element, a switching element and wirings for them is twice that where a single elements board is used. Consequently, one half of the area of one pixel can be used as an area to be occupied by the photo-sensitive element and the wirings. The conversion element is formed on the photo-sensitive element, and the conversion element converts a radiation into visible light and the photo-sensitive element detects and accumulates the visible light as a signal.

One half of an incoming radiation is detected by regions occupied by the photo-sensitive elements and the wirings of the first elements board. Then, the other portion of the radiation directed upon the other region of the first elements board than the regions occupied by the photo-sensitive elements and the wirings passes through the first elements board in the other region and is inputted to the second elements board. In this instance, the regions of the second elements board occupied by the photo-sensitive elements and the wirings thereon correspond to the other region of the first elements board than the regions occupied by the photo-sensitive elements and the wirings. Consequently, the radiation having passed through the first elements board is detected by the regions of the second elements board occupied by the photo-sensitive elements and the wirings thereon. In this manner, a radiation directed upon the image detector composed of two elements boards is detected by the elements boards half by half.

One pixel formed from a conversion element, a photo-sensitive element, a switching element and wirings for them is divided into a portion composed of the photo-sensitive element and the conversion element formed on the photo-sensitive element and another portion composed of the switching element. Therefore, one pixel has a rectangular shape wherein the ratio between the length thereof in a direction in which the switching elements and the photo-sensitive elements are arranged alternately and the length thereof in a perpendicular direction in which the switching elements or the photo-sensitive elements are arranged linearly on the elements boards is approximately 2:1. The second elements board is displaced from the first elements board, in the direction in which the switching elements and the photo-sensitive elements are arranged alternately, by a distance equal to one half the length of the pixel in the direction. Consequently, the position of a portion of a pixel of the first elements board which is formed from a switching element corresponds to the position of a portion of another pixel of the second elements board which is formed from a photo-sensitive element and a conversion element formed on the photo-sensitive element.

Signals detected by the photo-sensitive elements of each of the elements boards and the conversion elements formed on the photo-sensitive elements and corresponding to the intensities of a radiation are accumulated in the photo-sensitive elements. The accumulated signals are outputted to the outside of the elements boards as signal reading out is controlled by the switching elements. The signals read out as output signals are converted into digital signals by an analog to digital converter and recorded into a memory. Here, in the direction in which the switching elements or the photo-sensitive elements are arranged linearly on each of the elements boards, since the photo-sensitive elements are arranged linearly in order on each of the elements boards, the positions at which a radiation is detected and the signals outputted from the board correspond continuously to each other. However, in the perpendicular direction in which the switching elements and the photo-sensitive elements are arranged alternately on the elements boards, the positions at which a radiation is detected alternately appear between the first and second elements boards. Consequently, a single joined image is formed by an operation of re-arranging, based on image data of two images from the two elements boards recorded in the memory, the pixels of the image data of the two images alternately in the direction in which the switching elements and the photo-sensitive elements are arranged alternately on the elements boards.

In each of the elements boards, in the direction in which the switching elements or the photo-sensitive elements are arranged linearly in order, the distance between the centers of the photo-sensitive elements is equal to the length of one pixel in the direction in which the switching elements or the photo-sensitive elements are arranged linearly in order. However, in the perpendicular direction in which the switching elements and the photo-sensitive elements are arranged alternately, the distance between the centers of the photo-sensitive elements is equal to twice the length of one pixel in the direction in which the switching elements or the photo-sensitive elements are arranged linearly in order. Consequently, image data outputted from the elements boards have different sampling pitches between the two perpendicular directions. Then, by joining the image data of the two images from the two elements boards, a single image whose sampling pitch is equal in the two perpendicular directions is obtained.

With the 2-dimensional radiation image detector of the present invention, since a scintillator element of an independent structure is formed directly on each of pixels which form a detector, an image of a higher resolution than that which is obtained by the conventional 2-dimensional radiation image detector disclosed in U.S. Pat. No. 5,187,369 can be obtained. Further, although the 2-dimensional radiation image detector of the present invention has an equivalent construction to the conventional 2-dimensional radiation image detector disclosed in U.S. Pat. No. 5,262,649, the time constant upon reading out of signals from the photo-sensitive elements can be optimized based on the pixel pitch, the size of the image detector, the imaging rate, the signal to noise ratio of an image and so forth.

According to the present invention, an image having an equal resolution in both of the direction of a column and the direction of a row like an image obtained by a conventional apparatus formed from only one elements board, which is of a structure wherein pixels each having an equal length in both of the direction of a column and the direction of a row are arranged on a single elements board, is obtained by an image detector which is formed from two elements boards. Further, since the phosphor films are separate for the individual pixels, the spatial resolution itself can be raised. Furthermore, a 2-dimensional radiation image detector of a large size wherein the area of each photo-sensitive part is increased very much to raise the sensitivity can be realized.

Further, according to the present invention, five or more unit image detectors can be combined to obtain an image detector of a very large area. Consequently, there is an advantage in that the necessity to produce image detectors employing elements boards of different sizes in accordance with applications is eliminated and 2-dimensional radiation image detectors having such large areas as to allow the 2-dimensional radiation image detectors to be applied to various applications or having various areas can be produced by combination of image detectors which are composed of elements boards having an equal size.

The present invention is summarized as follows with reference to FIG. 1.

A detector is composed of two elements boards including a first elements board 11 and a second elements board 12, and phosphor films 51 for converting a radiation into visible light are formed on a plurality of photo-sensitive elements on each of the elements boards. A radiation 61 is converted into visible light by the phosphor films of the first elements board 11 and detected. Another radiation 62 is directed upon a region of the first elements board in which the phosphor films are not present, and passes through the first elements board, whereafter it is converted into visible light by the phosphor films of the second elements board and detected. The phosphor films are formed in a region of the second elements board corresponding to the region of the first elements board in which the phosphor films are not present, and a radiation directed upon the detector is detected separately twice by the first elements board and the second elements board. From two images based on signals of the radiation detected by the two elements boards, a single image whose spatial resolution is uniform between the perpendicular arrangement directions of the pixels. According to the detector of the present invention, the area of a pixel is twice that according to conventional detectors, and each light-sensitive part has a comparatively large area.

DESCRIPTION OF THE PREFERRED EMBODIMENTS

First Embodiment

Figure 1:
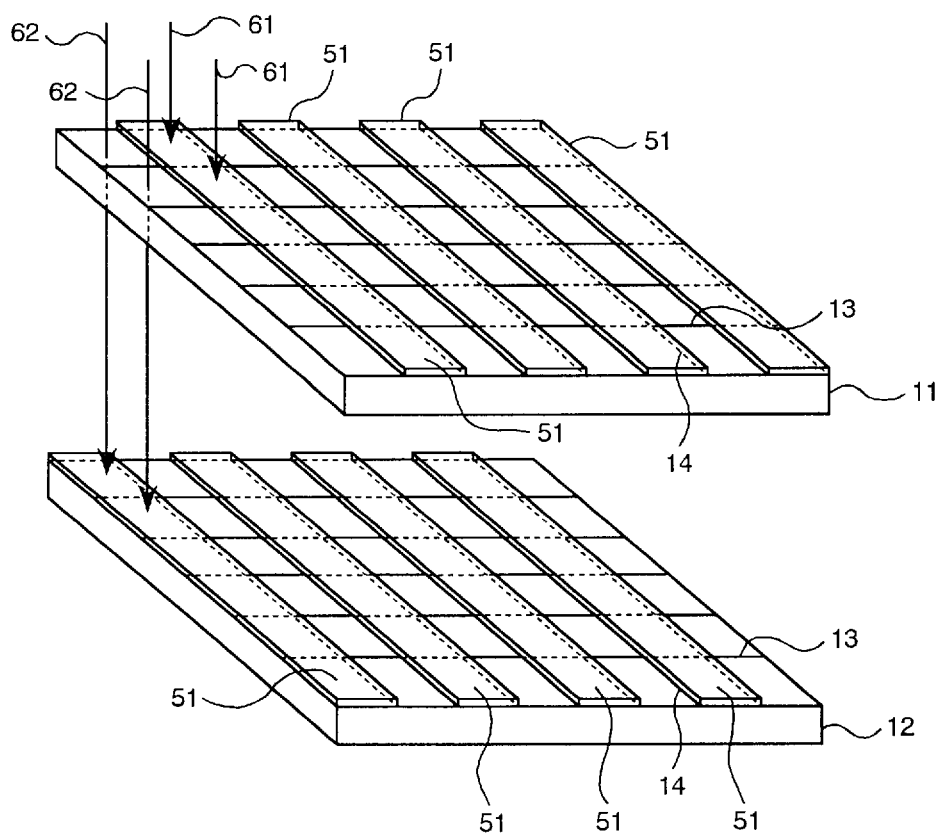
FIG. 1 is a perspective view showing an arrangement of two elements boards in a detector of a first embodiment of the present invention.

A first embodiment of an apparatus of the present invention will be described with reference to FIG. 1. Referring to FIG. 1, a radiation (X-ray) image detector includes a set of two elements boards including a first elements board 11 and a second elements board 12. At locations on each elements board at which a plurality of photo-sensitive elements are positioned, phosphor films 51 each serving as a conversion element which converts X-rays into visible light is formed above a plurality of photo-sensitive elements. In FIG. 1, a borderline between pixels is denoted at 13 or 14. Of X-rays directed upon the detector, an X-ray 61 is converted into visible light by the phosphor films 51 of the first elements board 11 and detected by the first elements board 11. On the other hand, of the X-rays directed upon the detector, an X-ray 62 is directed upon an area of the first elements board 11 in which the phosphor films 51 are not formed, and consequently, the X-ray 62 passes through the first elements board 11 and is converted into visible light by the phosphor films 51 of the second elements board 12 and detected by the second elements board 12. Here, since regions of the first elements board 11 in which the phosphor films 51 are not formed correspond to regions of the second elements board 12 in which the phosphor films 51 are formed, the X-rays directed upon the image detector are all detected but separately by the first elements board 11 and the second elements board 12.

Figure 2:
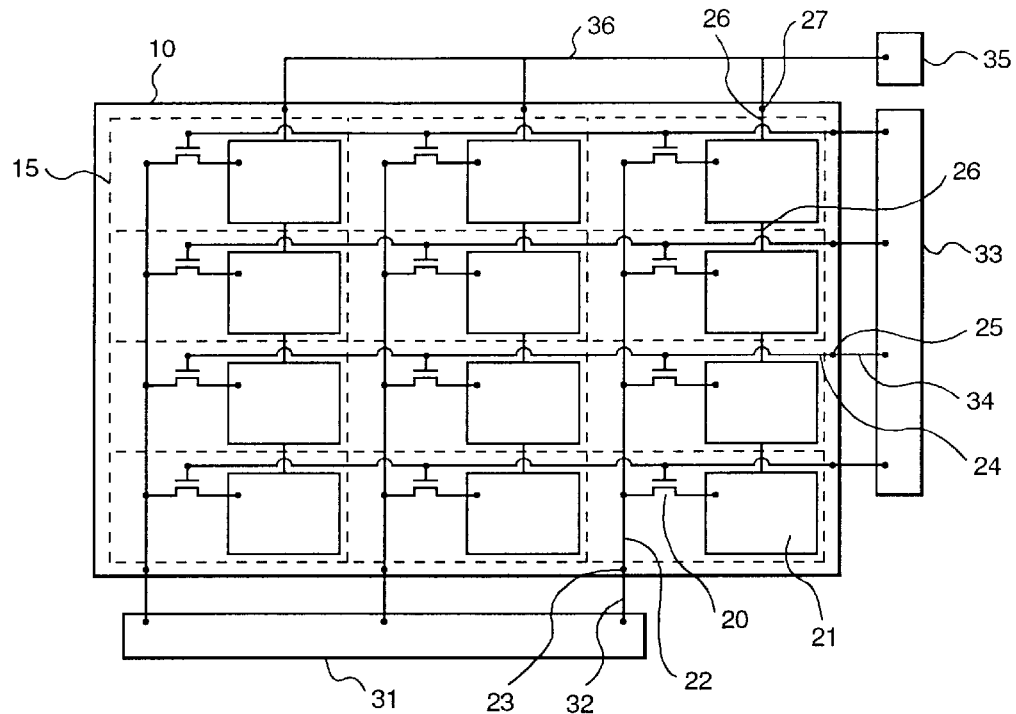
FIG. 2 is a schematic view showing elements and wirings on the elements boards in the detector of the first embodiment of the present invention.
Figure 3:
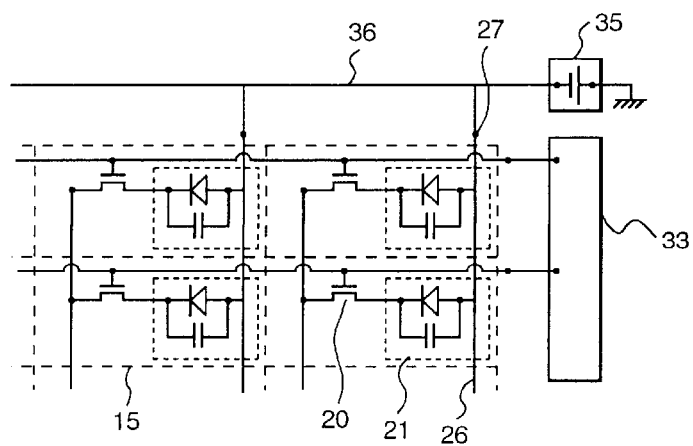
FIG. 3 is a diagrammatic view showing an equivalent circuit of a photo-sensitive part of the detector of the first embodiment of the present invention.

A construction as the image detector on each of the elements boards is shown in FIG. 2. Referring to FIG. 2, combinations of a photo-sensitive part 21 serving as a photo-sensitive element and a transistor 20 serving as a switching element are arranged two-dimensionally on an elements board 10. The photo-sensitive part 21 is a light detecting diode represented by an equivalent circuit including a diode and a capacitor shown in FIG. 3, and a reverse bias voltage is applied to the photo-sensitive part 21 from a driving element 35 via a wiring 36, an electrode 27 and a wiring 26 for voltage supply. An X-ray is converted into visible light by a phosphor film 51, and the visible light is detected by a photo-sensitive part 21 and accumulated as a charge which increases in proportion to the intensity of the X-ray. Consequently, a two-dimensional intensity distribution of the X-rays directed upon the image detector is replaced as accumulated charge amounts of the photo-sensitive parts on the image detector into and accumulated as a two-dimensional distribution of the accumulated charge amounts on the image detector.

The accumulated charge signals are successively read out as the transistors 20 each serving as a switching element are driven by a driving element 33. In FIG. 2, as delineated by borderlines 15 of pixels indicated by broken lines, each pixel has a rectangular shape elongated in the leftward and rightward direction in FIG. 2, and parallel wirings 24 for switching for driving the transistors 20 extend in the leftward and rightward direction in FIG. 2 while wirings 22 for signal extend in the upward and downward direction perpendicular to the leftward and rightward direction. Also the wirings 26 for voltage supply for applying a reverse bias voltage to the photo-sensitive parts 21 extend in the upward and downward direction in FIG. 2.

In order to read out the signals, an on-voltage is applied from the driving element 33 to the gates of the transistors 20 in the uppermost row of FIG. 2 through a corresponding wiring 34, electrode 25 and parallel wiring 24 for switching. In this instance, an off-voltage is applied to the gates of the transistors other than the transistors in the uppermost row to put those transistors to an off-state. As a result, the charge signals accumulated in the photo-sensitive parts 21 in the uppermost row in the columns are read out at a time by an output element 31 via the wirings 22 for signal, electrodes 23 and wirings 32 in the individual columns. Then, the transistors in the uppermost row are put into an off-state while the transistors in the second row from above in FIG. 2 are put into an on-state so that the charge signals accumulated in the photo-sensitive parts 21 in the second row in the columns are read out at a time by the output element 31 in a similar manner. The sequence of operations described above is successively repeated for the following rows to read out the signal charges accumulated in all of the photo-sensitive parts 21 on the elements board 10. The charge signals read out in parallel at a time from the columns by the output element 31 are converted by the output element 31 into and outputted as a serial time series signal in FIG. 4. The serial time series signal is converted into a digital signal by an analog to digital converter 41 and recorded as a digital signal by imaging controller and image-acquisition means 42.

Referring to FIG. 2, each borderline 15 of pixels shown by broken lines represents a borderline between pixels which are each formed from a unit of a combination of a photo-sensitive part 21 serving as a photo-sensitive element and a transistor 20 serving as a switching element. Each of the pixels has a rectangular shape dimensioned such that the length thereof in the direction of a row is approximately twice the length thereof in the direction of column, and a half region of the rectangular region is occupied by a photo-sensitive part 21 and a parallel wiring 24 for switching. Consequently, where the width of the photo-sensitive part 21 in the direction of a row in FIG. 2 is taken as a reference, the distance between the centers of adjacent photo-sensitive parts 21 is, in the direction of a row, approximately twice the width of the photo-sensitive part 21 in the direction of a row, but is, in the direction of a column, substantially equal to the width of the photo-sensitive part 21 in the direction of a row. The sectional structure of the elements boards taken in the direction of a row in FIG. 2 is shown in FIG. 6.

Figure 6:
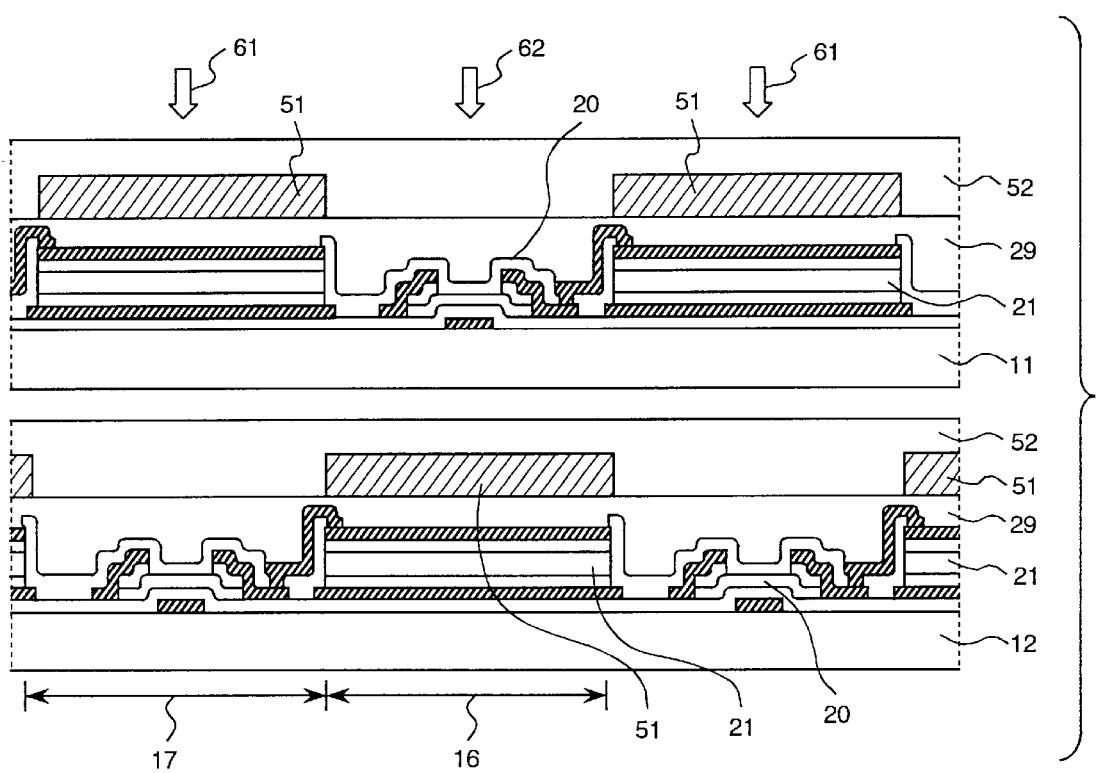
FIGS. 6 and 7 are schematic sectional views of the detector of the first embodiment of the present invention.

Referring to FIG. 6, there is shown a section of the image detector of the structure formed from a set of two image detectors formed on the first and second boards 11 and 12. The width 16 of photo-sensitive element region indicated by a width of a double-sided arrow mark represents the width of a plurality of photo-sensitive elements in one pixel while the width 17 of switching element region of a switching element indicated by the width of a double sided arrow mark represents the width of the switching element in one pixel. The magnitudes in width of the two regions are substantially equal to each other, and a sum of them corresponds to the width of one pixel in the direction of a row in FIG. 2. A phosphor film 51 is formed with a width substantially equal to the width 16 of photo-sensitive element region of a plurality of photo-sensitive elements on each of the photo-sensitive parts 21, and the phosphor thereof absorbs the incoming X-ray 61 or 62 and converts the energy of the incoming X-ray 61 or 62 into visible light, which is detected by the photo-sensitive part 21.

The positions of a plurality of photo-sensitive elements and switching elements formed on the first and second elements boards 11 and 12 are displaced from each other between the first and second elements boards 11 and 12 as seen in FIG. 6 in the direction of a column of FIG. 2 by a distance equal to the width 16 of photo-sensitive element region of a plurality of photo-sensitive elements represented by the width of a double-sided arrow mark in FIG. 2. Consequently, the X-ray 61 is absorbed by the phosphor films 51 formed on the first elements board 11. However, since the X-ray 62 is inputted to a region of the first elements board 11 in which the phosphor film is not formed, it passes through the first elements board 11 and is absorbed by the phosphor films 51 formed on the second elements board 12.

The plurality of photo-sensitive elements and switching elements formed on the elements boards are made of a material of amorphous silicon or poly-silicon, and by a process for thin film formation, such photo-sensitive diodes as the photo-sensitive parts 21 or the transistors 20 as shown in FIG. 6 are formed on the boards. The elements boards are each formed from a thin plate of glass or quartz. After those thin film elements are formed, a film 29 for flattening is formed to form a flat surface leveling convexes and concaves by the thin film elements.

Also wirings between the elements such as light detecting diodes and transistors formed by the thin film formation process are formed on the elements boards by a thin film formation process. Those wirings include wirings 22 for signal, electrodes 23, 25 and 27, parallel wirings 24 for switching, wirings 26 for voltage supply and so forth and are formed from a material of amorphous silicon or poly-silicon or another material such as a conductive metal. In FIG. 6, the X-ray 61 is absorbed by the phosphor films 51 on the first elements board 11 and converted into signals while the X-ray 62 passes through the first elements board 11 and is absorbed by the phosphor films 51 on the second elements board 12. Here, the ratio at which the X-ray 62 passes through the first elements board 11 will be described with reference to Table 1 below.

TABLE 1

Difference in transmissivity of an X-ray through glass plates different in thickness

| X-ray energy | Thickness of glass | | | |
| --- | --- | --- | --- | --- |
| | 0.5 mm | 1.0 mm | 2.0 mm | 3.0 mm |
| 20 keV | 74.6% | 55.7% | 31.0% | 17.3% |
| 30 keV | 90.3% | 81.5% | 66.5% | 54.2% |
| 40 keV | 94.6% | 89.4% | 79.9% | 71.4% |
| 50 keV | 96.2% | 92.4% | 85.5% | 79.0% |
| 60 keV | 96.9% | 93.9% | 88.2% | 82.8% |

The thicknesses of the elements and wirings formed on elements boards are less than several $\mu$mm, and absorption of an X-ray by them can be ignored where the energy of the X-ray is higher than 20 keV. Further, also the thickness of the film for flattening has a substantially similar value and can be ignored. Therefore, absorption of an X-ray principally depends upon the thickness of the plate of glass or quartz serving as the first elements board. In Table 1, ratios at which an X-ray having energy of 20 to 60 keV passes through the elements boards which are made of quartz having a density of 2.6 and whose thickness ranges from 0.5 to 3 mm are listed. From Table 1, the X-ray transmittivity is higher than 50% except the case wherein the glass thickness is equal to or greater than 2 mm and the X-ray energy is 20 keV. Consequently, the absorption of an X-ray by glass is substantially small, and most of the X-ray 62 directed upon the image detector passes through the first elements board and is absorbed and converted by the phosphor film on the second elements board into a signal.

In FIG. 6, while the thickness of the plate of glass or quarts serving as the first elements board 11 is equal to the thickness of the second elements board 12, also another structure wherein the thickness of the first elements board is smaller than that of the second elements board may be available. In this instance, the transmissivity of the X-ray 62 through the first elements board increases to increase the X-ray absorption amount by the phosphor film of the second elements board thereby to assure a higher sensitivity.

If the thickness of an elements board is excessively small, then it is difficult for the elements board to maintain its strength. Therefore, the first elements board is formed so as to have a two-layer structure including an element formed from the conventional first elements board 11 but with a much reduced thickness and a support board 18 for maintaining the strength of the first elements board 11. Here, the support board 18 is formed from a material having a low X-ray absorption factor such as a resin, different from glass or quartz from which the first elements board 11 is formed. Particularly a resin material whose average atomic number of component elements and material density are lower than those of glass or quartz is used. Preferably, a carbonate resin whose principal chain is formed from carbon atoms is used as the resin material.

Figure 7:
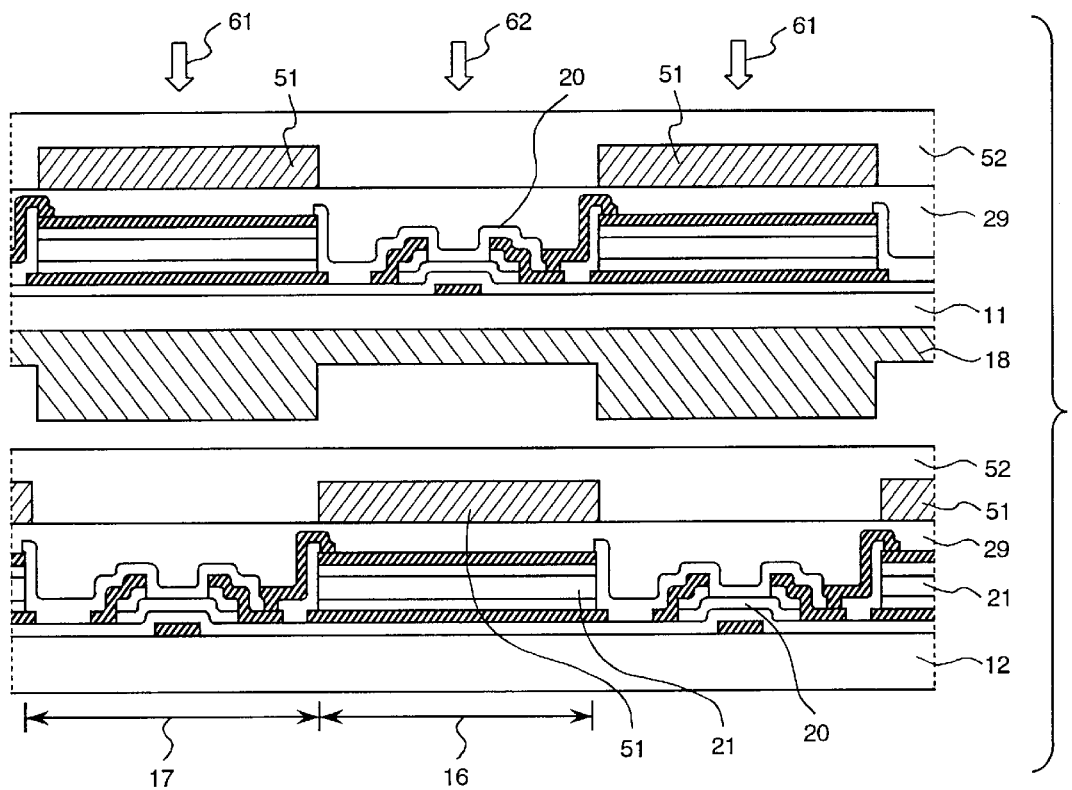

Further, the support board 18 may have, in each of regions thereof which correspond to regions of the second elements board in which the phosphor films are formed, a grooved structure as seen in FIG. 7. Due to the grooved structure, each portion of the elements board through which an X-ray is to pass is reduced in thickness. Consequently, the X-ray transmissivity is further improved and the strength as a board can be maintained.

Figure 8:
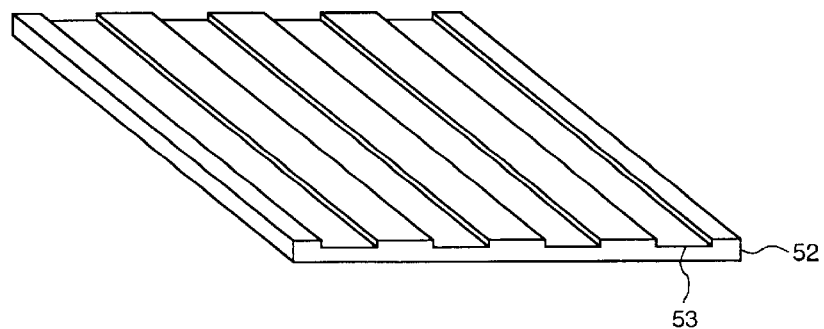
FIG. 8 is a perspective view showing a structure of a support for phosphor in the detector of the first embodiment of the present invention.
Figure 9:
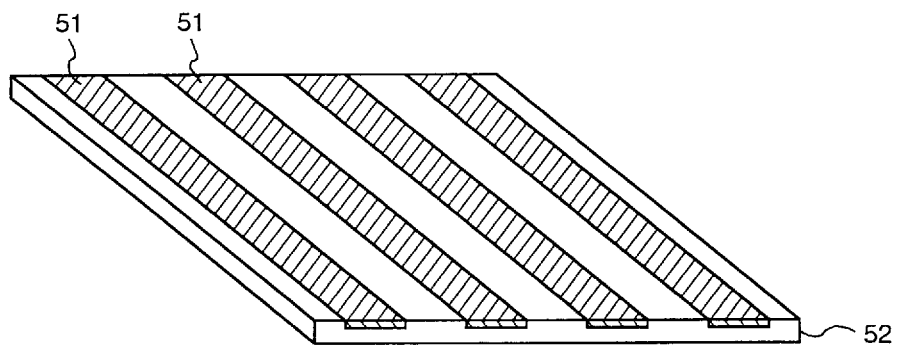
FIG. 9 is a perspective view showing a structure of the support for phosphor and a phosphor film in the detector of the first embodiment of the present invention.

A structure including phosphor films 51 and a support 52 for phosphor which supports the phosphor films 51 is formed on the film 29 for flattening shown in FIG. 6. A method of forming the phosphor film portion will be described with reference to FIGS. 8, 9 and 10. First, as shown in FIG. 8, the support 52 for phosphor has grooves 53 having a width substantially equal to that of the width 16 of photo-sensitive element region of the photo-sensitive elements. It is to be noted that the width of each of portions of the support 52 for phosphor corresponding to the belt-like convex portions is substantially equal to the width 17 of switching element region. A phosphor is filled in the grooves to form phosphor films as shown in FIG. 9. Further, if a metal film or the like having a high reflection factor to light is formed on the inner sides of the grooves, then the extraction efficiency of light from the phosphor film is further improved. Furthermore, an opaque film 54 which is opaque with respect to visible light and has a low reflection factor with respect to visible light is formed on the surfaces of portions of the support 52 for phosphor which correspond to the belt-like convex portions other than the phosphor films. The opaque film 54 suppresses diffusion of visible light generated in the phosphor in a direction parallel to the elements board to improve the spatial resolution as an image detector.

Figure 10:
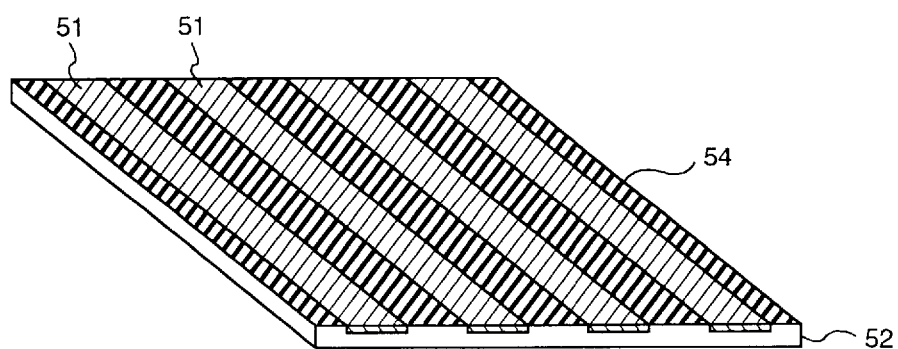
FIG. 10 is a perspective view showing a structure of a conversion element for converting a radiation into visible light in the detector of the first embodiment of the present invention.

After the phosphor film structure having such a structure as shown in FIG. 10 is formed, it is fixed such that the surfaces of the phosphor films 51 contact with the surface of the film 29 for flattening as shown in FIG. 6 to form a 2-dimensional radiation image detector. In this instance, when the phosphor film structure of FIG. 10 is fixed to the film for flattening, it is fixed such that the phosphor films may be positioned above the photo-sensitive parts 21. With the present construction, the area of the phosphor films is reduced substantially to one half with respect to the area of the elements board.

Figure 11:
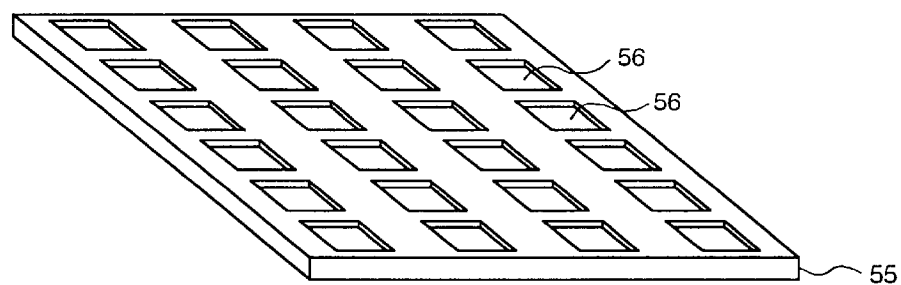
FIG. 11 is a perspective view showing a structure of the support for phosphor in the detector of the first embodiment of the present invention.

It is to be noted that, in order to further suppress diffusion of visible light emitted from the phosphor film in a direction parallel to the elements board to improve the spatial resolution as an image detector, partitions are provided in a direction perpendicular to the grooves of FIG. 8. As shown in FIG. 11, a support 55 for phosphor of a structure having rectangular holes 56 at positions corresponding to the individual photo-sensitive elements is used. Using the support 55 for phosphor, the area of the partitioned sections to be filled up with a phosphor can be made substantially coincide with the area of the photo-sensitive parts to further improve the spatial resolution without deterioration of the sensitivity.

Subsequently, contents of processing of signals read out from the photo-sensitive parts on the first and second elements boards will be described. Although the image detector has a structure wherein the first and second elements boards are overlapped with each other, for convenience of illustration and description, in FIG. 4, the structure is replaced with a structure wherein the first and second elements boards are juxtaposed with each other. Each of the elements boards shown has a 12-pixel construction including 3 pixels arranged in each horizontal row and 4 pixels arranged in each vertical column, and a joined image of images of the elements boards includes a number of pixels twice that of each of the elements boards. The joined image is shown at the right end in FIG. 5 and is shown as a joined image 70 of a 24-pixel construction including 6 pixels arranged in each horizontal row and 4 pixels arranged in each vertical column.

Figure 4:
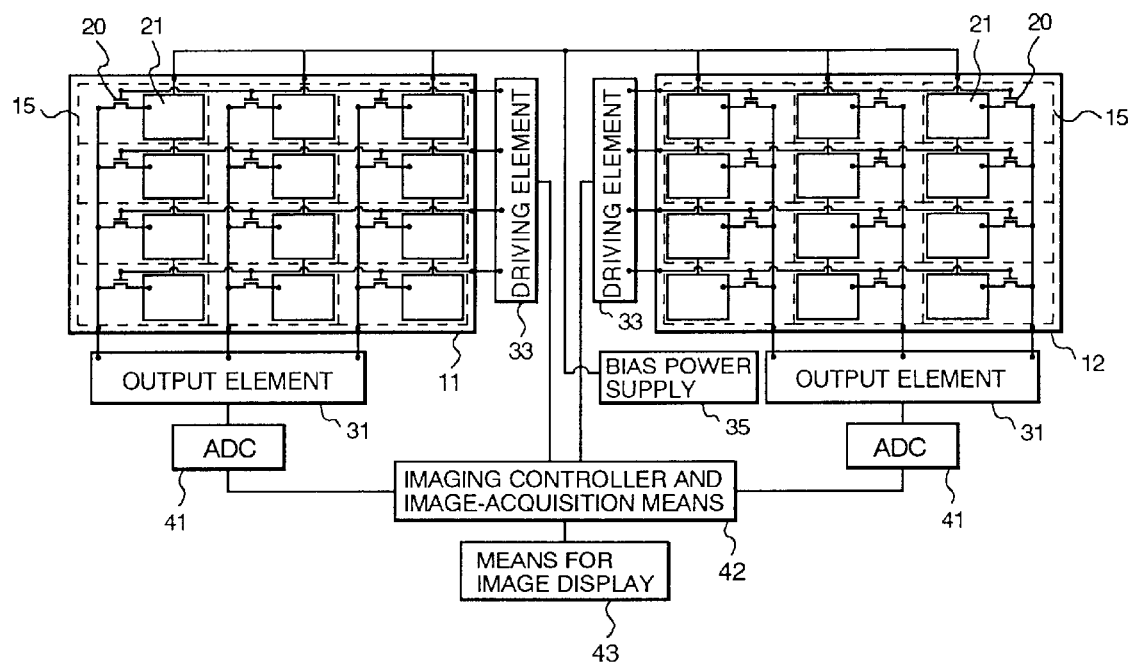
FIG. 4 is a diagrammatic view showing an entire construction of the detector of the first embodiment of the present invention.

Referring to FIG. 4, charge signals accumulated in the photo-sensitive elements on the first and second elements boards are read out in parallel at a time from the different columns by the output element. Those signals are converted into a serial time series signal by and outputted from the output element. The serial time series signal is then converted into a digital signal by the analog to digital converter 41 and recorded as a digital signal onto the imaging controller and image-acquisition means 42. In this instance, on the imaging controller and image-acquisition means 42, the digital signal is recorded as an image signal wherein the charge signals accumulated in the photo-sensitive elements on the first and second elements boards are arranged corresponding to the positions of the photo-sensitive elements on the elements boards.

Figure 5:
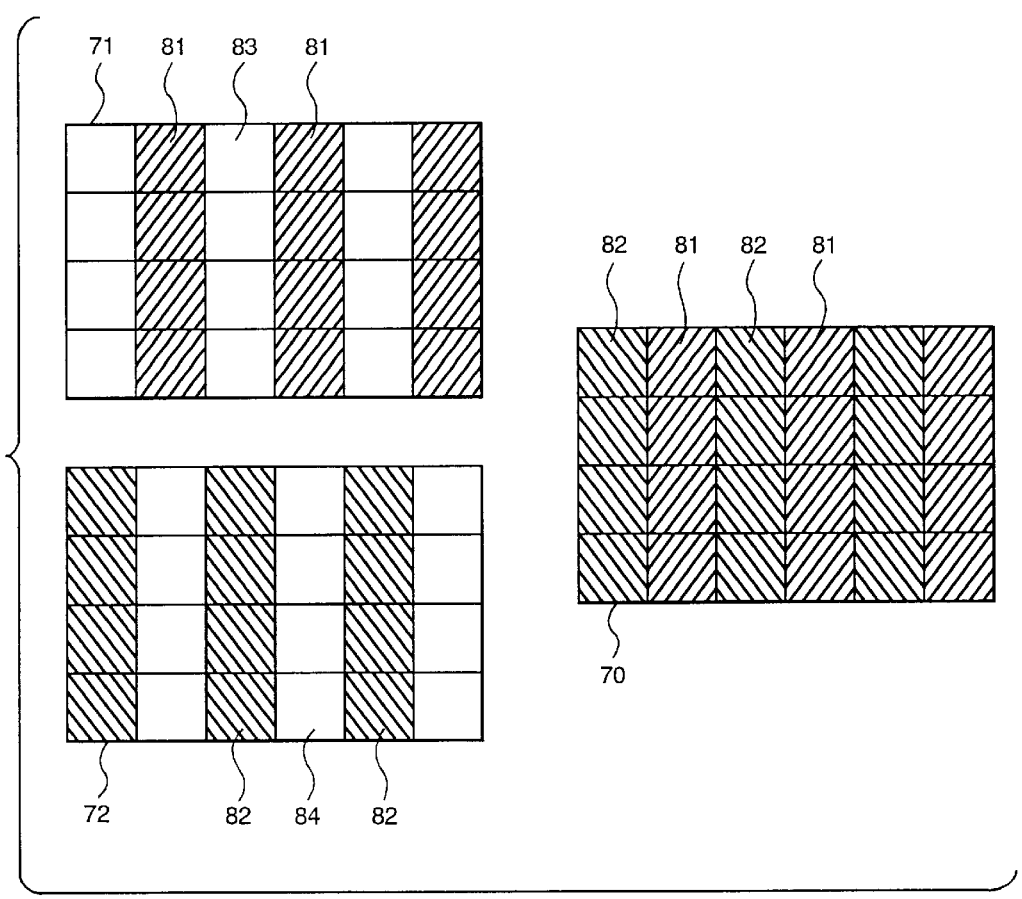
FIG. 5 is a diagrammatic view illustrating a method of joining images in imaging control and image processing of the detector of the first embodiment of the present invention.

The image signal from the first elements board is recorded as an image 71 obtained by the first elements board shown at a left upper portion of FIG. 5 in image regions 81 of the first elements board of even-numbered columns from the left in FIG. 5, and no image signal is present in vacant regions 83 of the first elements board in even-numbered columns from the left. On the contrary, the image signal from the second elements board is recorded as an image 72 obtained by the second elements board shown at a left lower portion of FIG. 5 in image regions 82 of the second elements board of odd-numbered columns, but the image signal is not present in vacant regions 84 of the second elements board in even-numbered columns from the left. Consequently, the joined image 70 can be obtained by replacing the vacant regions with the image signals in the mutually corresponding image regions. This processing is executed by the imaging controller and image-acquisition means 42, and the joined image is displayed on a monitor or the like by means 43 for image display.

It is to be noted that, since an X-ray having passed through the first elements board is detected by the second elements board, it has a reduced intensity. Consequently, comparing with the image signal outputted from the first elements board 11, the image signal outputted from the second elements board 12 has a lower signal level. In the image processing by the imaging controller and image-acquisition means 42 to form the joined image 70 from the image 71 obtained by the first elements board and the image 72 obtained by the second elements board in FIG. 5, the joined image is formed after the signal levels of the two image signals are adjusted. In this instance, for example, an average value of the image signal level of the image 71 obtained by the first elements board is calculated, and then the image signal level of the image 72 obtained by the second elements board is adjusted so that an average value of the image signal level of the image 72 obtained by the second elements board may coincide with the average value of the image signal level of the image 71 obtained by the first elements board.

Referring to FIG. 4, each of the pixels represented by borderlines 15 of pixels shown by broken lines has a rectangular shape so dimensioned that the length thereof in the direction of a row is approximately twice the length thereof in the direction of a column. Consequently, the distance between the centers of the image regions 81 and 82 of the elements boards corresponding to the individual pixels is substantially twice in the direction of a row the distance in the direction of a column. However, in the joined image 70, the vacant regions 83 or 84 of the elements board are replaced with image regions in which an image signal is present. Consequently, in the joined image 70, the distance between the centers of the image regions corresponding to the pixels is substantially equal in both of the direction of a column and the direction of a row. As a result, the joined image has a spatial resolution equal in both of the direction of a column and the direction of a row.

Figure 14:
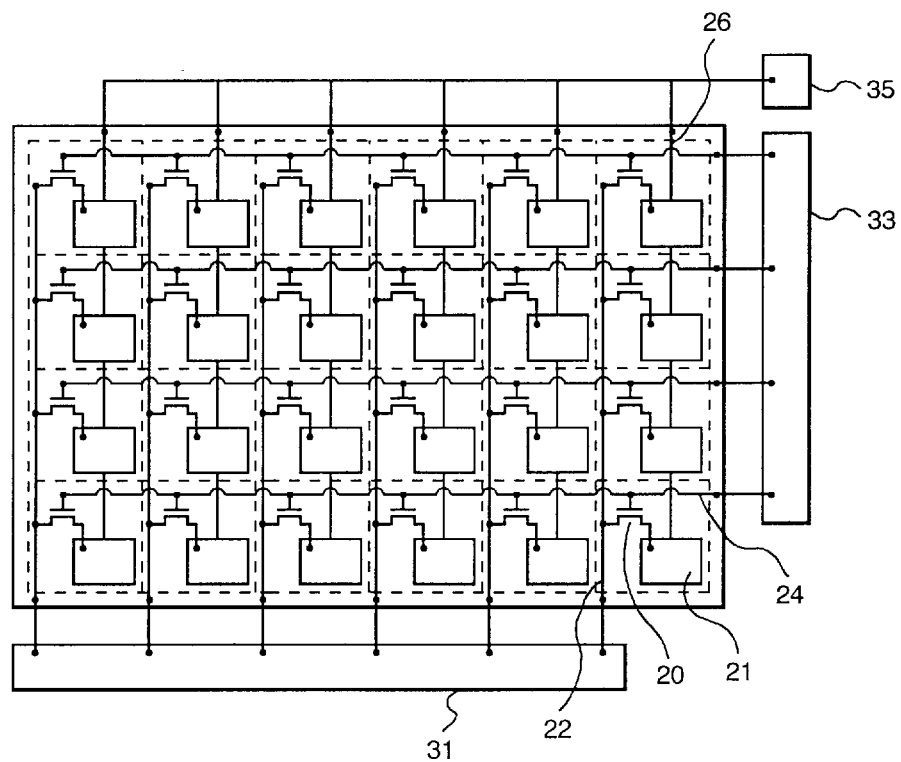
FIG. 14 is a schematic diagram showing elements and wirings on an elements board of a conventional detector.

According to the present invention, a radiation image detector can be realized which not only exhibits equal resolutions in the direction of a column and the direction of a row as with an image obtained from a conventional apparatus formed from a single elements board and having a structure shown in FIG. 14 wherein pixels having lengths equal in the direction of a column and the direction of a row are arranged on a single elements board but also has an improved spatial resolution because a phosphor film is divided for individual pixels and besides has a raised sensitivity by increasing the area of the photo-sensitive parts by a great amount.

While the single elements board shown in FIG. 4 is formed from 12 pixels for simplified illustration and description, an actual image detector has a very large number of pixels including 1,000,000 pixels or more. For a large number of pixels, in order to assure high speed reading out of signals from an elements board, a combination of a plurality of output elements and an analog to digital converter (ADC) is used. While, in the construction shown in FIG. 4, the pixels are arranged in four rows and three columns, a construction wherein pixels are arranged, for example, in four rows and nine columns will be described.

In this instance, the pixels are divided into three groups each including adjacent three columns. Corresponding to the three groups each including three columns, three output elements and ADCs are provided, and signals from the three ADCs are inputted in parallel to imaging controller and image-acquisition means. As a result, the read time of signals with the construction wherein the pixels are arranged in four rows and nine columns is equal to the read time of signals with the construction of FIG. 4 wherein the pixels are arranged in four rows and three columns. Also for a further larger number of pixels, reading out of signals in a short time can be achieved by providing a plurality of output elements and ADCs in a corresponding relationship to different groups of columns.

Second Embodiment

A second embodiment of an apparatus of the present invention will be described with reference to FIG. 12. In the embodiment shown in FIG. 12, in order to connect parallel wirings 24 for switching and electrodes 25 at an end portion of an elements board, wirings 28 for switching transmission are provided which extend perpendicularly to the parallel wirings 24 for switching. The wirings 28 for switching transmission extend in parallel to wirings 22 for signal, and the electrodes 25 for the wirings 28 for switching transmission are juxtaposed on a side same as the side of the end portion of the elements board along which electrodes 23 for wirings 22 for signal are juxtaposed. Further, electrodes 27 for wirings 26 for voltage supply are juxtaposed on the same side. In the present embodiment, electrodes for connecting the wirings in the elements board to an element 37 for outputting and driving, a bias power supply 35 and so forth outside the elements board are provided only along the one side of the elements board, and the other sides need not be used for electric connection.

Figure 13:
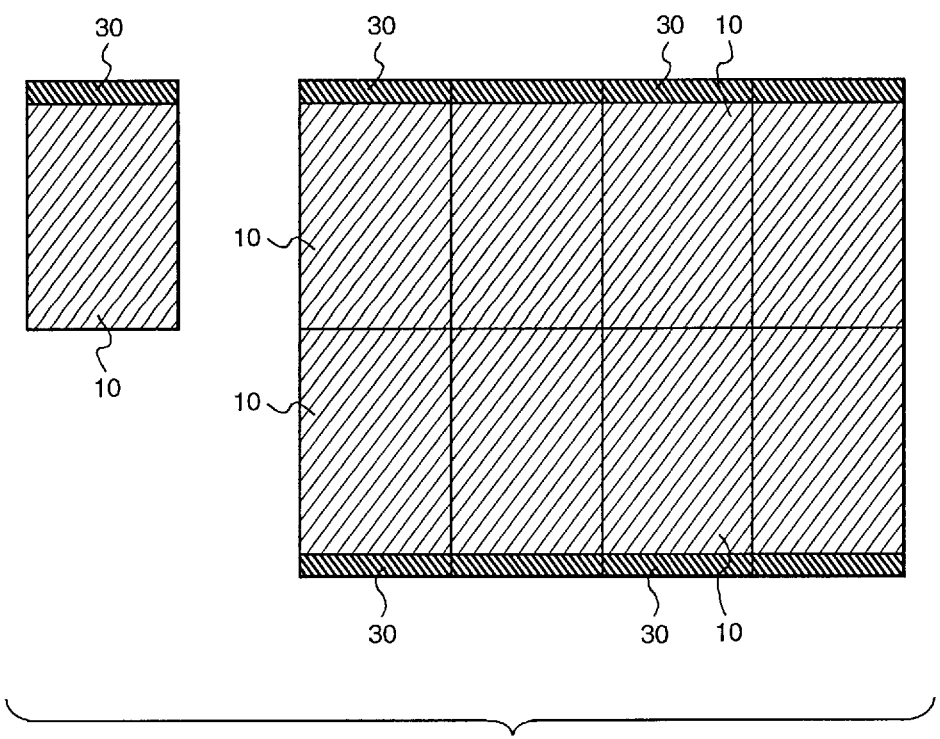
FIG. 13 is a diagrammatic view showing a construction of a radiation image detector of a large area wherein a plurality of unit image detectors are combined in the second embodiment of the present invention.

The apparatus of the present embodiment has, when drawn in a simplified form, such a construction as shown at a left portion of FIG. 13. In particular, the apparatus is formed from an elements board 10 and an element 30 for outputting, driving, and supplying power connected to one side of the elements board 10. In this instance, since the sides of the elements board 10 other than the one side to which the element 30 for outputting, driving, and supplying power is connected are empty, a plurality of image detectors, that is, a plurality of unit 2-dimensional radiation image detectors, can be combined such that, as shown at a right portion of FIG. 13, they are connected to each other at the empty sides thereof to form an image detector of a very large area. For example, where the elements board of the detector shown at the left portion of FIG. 13 is 15 cm long in the upward and downward direction in FIG. 13 and 10 cm wide in the leftward and rightward direction in FIG. 13, if eight such elements boards are combined in such a manner as shown at the right portion of FIG. 13, then a radiation image detector of a large area of 30 cm×40 cam can be implemented.

Figure 12:
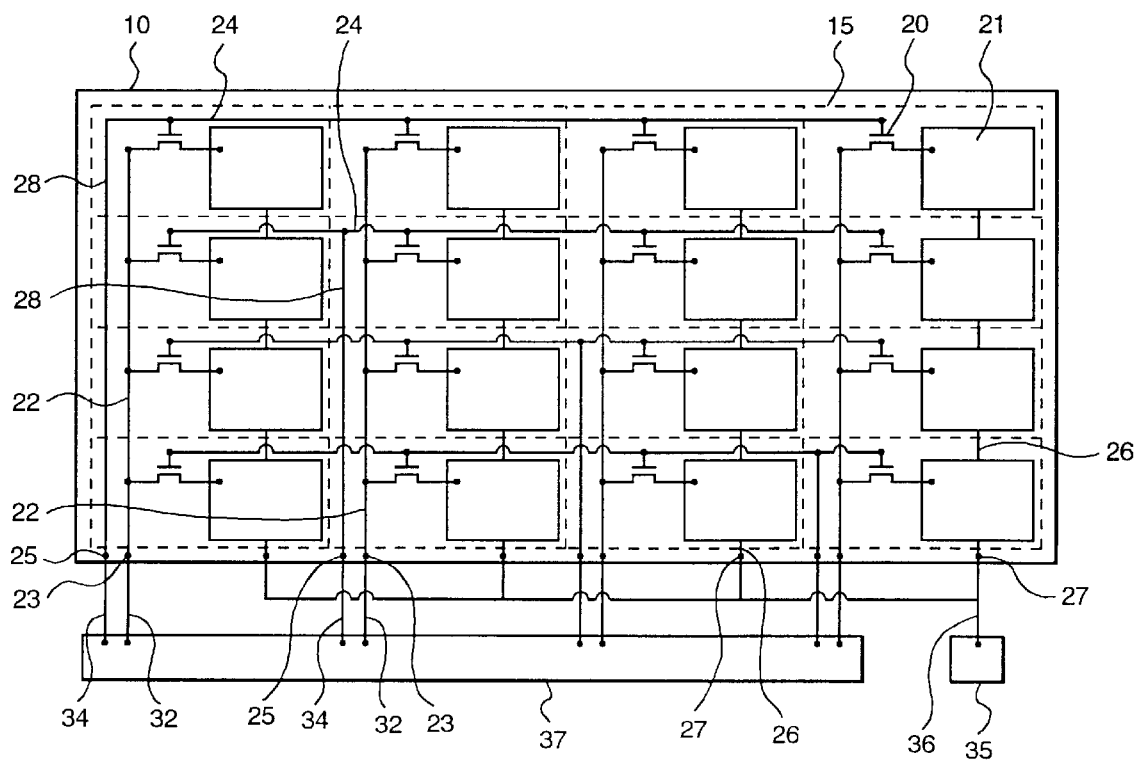
FIG. 12 is a schematic diagram showing elements and wirings on an elements board in a detector of a second embodiment of the present invention.

In the present embodiment, the parallel wirings 24 for switching in FIG. 12 are led in parallel to the wirings 22 for signal to the electrodes 25 on the side at the end portion of the elements board by means of the wirings 28 for switching transmission, and also the electrodes 27 for the wirings 26 for voltage supply are arranged on the same side of the elements board. As a result, according to the present embodiment, five or more image detector units (unit 2-dimensional radiation image detectors) of a predetermined size can be combined such that the elements board of at least one of them is connected at three of the four sides thereof to elements boards of other three of them. Consequently, a 2-dimensional radiation image detector of a very large area can be formed, and it is unnecessary to produce image detectors including elements boards of different sizes depending upon applications. According to the present embodiment, image detectors which can be applied to various applications for which different sizes or areas are required can be produced by combination of image detectors whose elements boards have an equal size.

An advantage of the present embodiment resides in that a radiation image detector of a large area can be realized, by which the number of pixels forming a detector can be increased. For example, where the elements board has a size of 20 cm long×10 cm wide and the pixels have a size of 100 $\mu$mm long and 200 $\mu$mm wide, a detector board of 1,000,000 pixels arranged in 2,000 pixels in the vertical direction and 500 pixels in the horizontal direction is obtained. An image detector which includes two such detector boards provides a joined image of 20 cm long×10 cm wide wherein the pixels have a size of 100 $\mu$mm square and the number of pixels is 2,000,000 pixels arranged in 2,000 pixels in the vertical direction and 1,000 pixels in the horizontal direction. Further, with a detector formed from a combination of eight such image detectors, the pixels in the joined image have a size of 100 $\mu$mm square, the area is 40 cm square, and the number of pixels is 16,000,000 arranged in a matrix of 4,000×4,000 pixels. Consequently, a large area and a high resolution equivalent to those of an X-ray film for diagnosis can be achieved. Further, the image detector is advantageous in that image signals can be stored directly as digital signals. In those forms of the image detector of the present embodiment described above, the two elements boards act as image detectors independent of each other.

Third Embodiment

Figure 15:
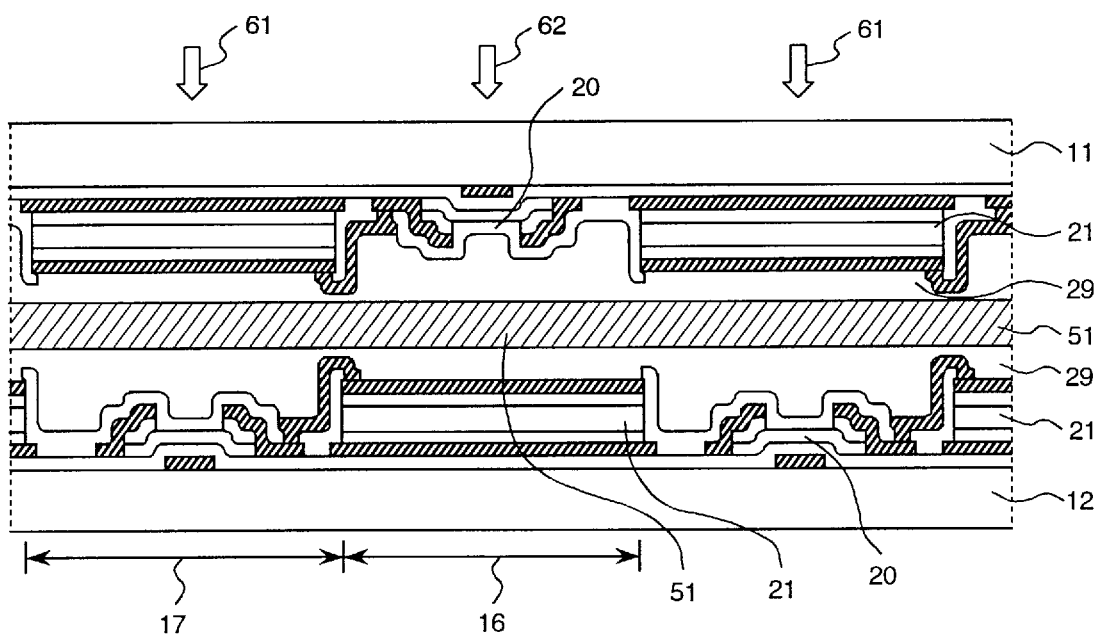
FIG. 15 is a sectional view of a detector of a third embodiment of the present invention.

Subsequently, an embodiment of a structure wherein phosphor films serving as conversion elements are formed as a single plate will be described with reference to FIG. 15. The structure shown in FIG. 15 is equivalent to the structure of FIG. 6 with the first elements board 11 of FIG. 6 arranged in a turned over condition. Further, a single phosphor film 51 is disposed such that a plurality of photo-sensitive elements on first and second elements boards are opposed to the opposite faces of the phosphor film 51. Consequently, both of the first and second elements boards detect signals of an X-ray having passed through the first elements board 11 and absorbed by the phosphor film 51.

According to the present embodiment, since signals of an X-ray having passed through the first elements board are detected by the conversion element of the two elements boards, the output signals from the elements boards exhibit no difference in intensity level between the two elements boards. Consequently, in joining two images, processing for adjusting the image signal levels between the two elements boards is not required, which facilitates joining of images.

In the embodiments described above, two images are detected by two elements boards and joined to form an image. However, in the present invention, the number of elements boards is not limited to two. For example, in FIG. 12 which shows a construction of a plurality of photo-sensitive elements and switching elements on an elements board, each pixel can be dimensioned so that the dimension thereof in the horizontal direction in FIG. 12 is equal to three times the dimension thereof in the vertical direction. In this instance, the area of a region formed from a plurality of photo-sensitive elements and parallel wirings for switching is set to one third the area of one pixel. Then, three such elements boards are used and combined in such a structure that they are displaced, in a direction along which the pixels exhibit a greater length, by a distance equal to one third the length of the pixels from each other. In this instance, the third elements board detects an X-ray component which has passed through the first and second elements boards. Totaling three images are obtained from the elements boards and joined together to form a single image.

In the present embodiment, a region of a pixel which has an area equal to one third the area of the pixel is formed from a plurality of photo-sensitive elements and parallel wirings for switching while the other region of two-third area is formed from a switching element and wirings. Consequently, since the area for the switching element and the wirings is comparatively large, the degree of freedom in formation process of switching elements on an elements board or in pattern of wirings increases, and the difficulty in manufacture of an image detector can be reduced.

Fourth Embodiment

The concept of the third embodiment can be expanded to a case wherein the number of elements boards is equal to or more than 4. In particular, in FIG. 12, each pixel can be dimensioned such that the dimension thereof in the horizontal direction is set equal to N times (N is an integer) the dimension thereof in the vertical direction in FIG. 12. Thus, the area of a region formed from a plurality of photo-sensitive elements and parallel wirings for switching is set to 1/N the area of one pixel, and N such elements boards are used and combined in such a structure that they are arranged in an overlapping relationship with each other but displaced, in a direction along which the pixels exhibit a greater length, by a distance equal to one Nth the length of the pixels from each other. In this instance, the Nth elements board detects an X-ray component which has passed through the first to (N−1)th elements boards, and totaling N images are obtained from the elements boards and joined together to form a single image. As a result, similarly as in the third embodiment, the area for the switching elements and the wirings can be further increased and the degree of freedom in formation process of switching elements on an elements board or in pattern of wirings increases, and the manufacture of a 2-dimensional radiation image detector can be made further ready.

While, in the embodiments described above, an X-ray is employed as a radiation, the present invention can be applied to detection of an image in which alpha rays, beta rays, gamma rays, and various corpuscular beams produced by accelerators or nuclear reactors.

Reference numerals used in the drawings are listed belows:

reference numeral 10 denotes an elements board;

11 a first elements board;

12 a second elements board;

reference numerals 13, 14 and 15 denote each a border line of pixels;

reference numeral 16 denotes a width of photo-sensitive element region;

17 a width of switching element region;

18 a support board;

20 a transistor;

21 a photo-sensitive part;

22 a wiring for signal;

reference numerals 23, 25 and 27 denote each an electrode;

reference numeral 24 denotes a parallel wirings for switching;

26 a wiring for voltage supply;

28 a wiring for switching transmission;

29 a film for flattening;

30 a element for outputting, driving, and supplying power;

31 an output element;

reference numerals 32, 34 and 36 denote each a wiring;

reference numeral 33 denotes a driving element;

35 a driving element;

35' a bias power supply;

37 an element for outputting and driving;

41 an analog to digital converter;

42 imaging controller and image-acquisition means;

43 means for image display;

51 a phosphor film;

reference numerals 52 and 55 denote each a support for phosphor;

reference numeral 53 denotes a groove;

54 an opaque film;

56 a rectangular hole;

61 an X-ray;

62 an X-ray;
70 a joined image;
71 an image obtained by the first elements board;
72 an image obtained by the second elements board;
81 an image region of the first elements board;
82 an image region of the second elements board;
83 a vacant region of the first elements board; and
84 a vacant region of the second elements board.

What is claimed is:

1. A 2-dimensional radiation image detector comprising:

a plurality of conversion elements for converting radiation into visible light;

a plurality of photo-sensitive elements for detecting the visible light and accumulating signals; and an elements board on which said conversion elements and said photo-sensitive elements are formed;

wherein said 2-dimensional radiation image detector includes two elements boards arranged in an overlapping relationship with each other and each having said plurality of photo-sensitive elements arranged two-dimensionally thereon such that the distance between centers of said photo-sensitive elements in one direction of the arrangement is substantially equal to a width of said photo-sensitive elements while the distance between the centers of said photo-sensitive elements in a direction perpendicular to the one direction is substantially equal to twice the width of said photo-sensitive elements, and such that that portion of radiation directed upon said two overlapping elements boards which has passed through a first one of said elements boards other than locations of said photo-sensitive elements is detected by said photo-sensitive elements of the second elements board; and wherein each of said conversion elements is in the form of a belt having a width equal to the width of at least one of said photo-sensitive elements in a direction in which the distance between centers of said photo-sensitive elements is substantially equal to the width of said photo-sensitive elements.

2. A 2-dimensional radiation image detector comprising:

a plurality of conversion elements for converting radiation into visible light;

a plurality of photo-sensitive elements for detecting the visible light and accumulating signals; and an elements board on which said conversion elements and said photo-sensitive elements are formed;

wherein said 2-dimensional radiation image detector includes two elements boards arranged in an overlapping relationship with each other and having an area approximately one half of which is occupied by phosphor films serving as said conversion elements;

wherein that portion of radiation directed upon said two overlapping elements boards which has passed through a first one of said elements boards other than locations of said photo-sensitive elements is detected by said photo-sensitive elements of the second elements board; and wherein each of said conversion elements is in the form of a belt having a width equal to the width of at least one of said photo-sensitive elements in a direction in which the distance between centers of said photo-sensitive elements is substantially equal to the width of said photo-sensitive elements.

3. A 2-dimensional radiation image detector comprising:

a plurality of conversion elements for converting radiation into visible light;

a plurality of photo-sensitive elements for detecting the visible light and accumulating signals;

a plurality of switching elements for reading out the signals accumulated in said plurality of photo-sensitive elements; and an elements board on which said conversion elements, said photo-sensitive elements and said switching elements are formed;

wherein said 2-dimensional radiation image detector includes two elements boards arranged in an overlapping relationship with each other and including a plurality of sets of detection pixels each including one of said photo-sensitive elements and one of said switching elements and arranged two-dimensionally on each of said elements boards;

wherein in a region of a substantially one half area of each of said detection pixels on each of said elements boards in a direction in which said photo-sensitive elements and said switching elements are arranged alternately, a parallel wiring for switching control for controlling a corresponding one of said switching elements and a corresponding one of said photo-sensitive elements are formed;

wherein that portion of radiation directed upon said two overlapping elements boards which has passed through a first one of said elements boards other than locations of said photo-sensitive elements is detected by said photo-sensitive elements of the second elements board; and wherein each of said conversion elements is in the form of a belt having a width equal to the width of at least one of said photo-sensitive elements in a direction in which the distance between centers of said photo-sensitive elements is substantially equal to the width of said photo-sensitive elements.

4. A 2-dimensional radiation image detector comprising:

a plurality of conversion elements for converting radiation into visible light;

a plurality of photo-sensitive elements for detecting the visible light and accumulating signals; and an elements board on which said conversion elements and said photo-sensitive elements are formed;

wherein said 2-dimensional radiation image detector includes two elements boards arranged in an overlapping relationship with each other such that that portion of radiation directed upon said two overlapping elements boards which has passed through a first one of said elements boards other than locations of said photo-sensitive elements is detected by said photo-sensitive elements of the second elements board; and wherein each of said conversion elements is in the form of a belt having a width equal to the width of at least one of said photo-sensitive elements in a direction in which the distance between centers of said photo-sensitive elements is substantially equal to the width of said photo-sensitive elements.

5. A 2-dimensional radiation image detector according to any one of claims 1 to 4, wherein two images obtained by detection by said photo-sensitive elements of said two elements boards are joined together to form a single joined image which includes a number of pixels twice that of each of the two images.

6. A 2-dimensional radiation image detector according to any one of claims 1 to 4, wherein said two elements boards are arranged in an overlapping relationship with each other such that said two elements boards are displaced from each other in a direction by a distance corresponding to the width of said photo-sensitive elements.

7. A 2-dimensional radiation image detector according to any one of claims 1 to 4, wherein said photo-sensitive elements are photo-sensitive diodes made of amorphous silicon or poly-silicon.

8. A 2-dimensional radiation image detector according to any one of claims 1 to 4, wherein said plurality of switching elements for reading out the signals accumulated in said photo-sensitive elements are transistors made of amorphous silicon or poly-silicon.

9. A 2-dimensional radiation image detector according to any one of claims 1 to 3, wherein parallel wirings for switching control for controlling said switching elements in parallel are arranged on each of said elements boards and are wired in a direction in which the distance between centers of said photo-sensitive elements is approximately twice the width of said photo-sensitive elements.

10. A 2-dimensional radiation image detector according to any one of claims 1 to 3, wherein parallel wirings for switching control for controlling said switching elements in parallel are arranged on each of said elements boards and are wired in a direction in which the distance between centers of said photo-sensitive elements is approximately twice the width of said photo-sensitive elements, and the signals accumulated in said photo-sensitive elements are read out at a time in the direction in which the distance between the centers of said photo-sensitive elements is approximately twice the width of said photo-sensitive elements.

11. A 2-dimensional radiation image detector according to any one of claims 1 to 4, wherein wirings for switching parallel control arranged on each of said elements boards and wirings for switching transmission for interconnecting said wirings for switching parallel control and an end portion of the elements board are arranged on the elements board such that said wirings for switching parallel control and said wirings for switching transmission extend perpendicularly to each other.

12. A 2-dimensional radiation image detector according to any one of claims 1 to 4, wherein wirings for signal for reading out the signals accumulated in said photo-sensitive elements via said switching elements are arranged on each of said elements boards and are wired in a direction in which the distance between centers of said photo-sensitive elements is approximately equal to the width of said photo-sensitive elements.

13. A 2-dimensional radiation image detector according to any one of claims 1 to 4, wherein wirings for signal for reading out the signals accumulated in said photo-sensitive elements via said switching elements are arranged on each of said elements boards and are wired in a direction in which the distance between centers of said photo-sensitive elements is approximately equal to the width of said photo-sensitive elements, and wirings for switching transmission and said wirings for signal are wired in parallel to each other on the elements board.

14. A 2-dimensional radiation image detector according to any one of claims 1 to 4, wherein wirings for voltage supply for applying a voltage to said photo-sensitive elements are arranged on each of said elements boards in order to accumulate signals in said photo-sensitive elements and are wired in a direction in which the distance between centers of said photo-sensitive elements is approximately equal to the width of said photo-sensitive elements.

15. A 2-dimensional radiation image detector according to any one of claims 1 to 4, wherein electrodes for electric connection to the outside of said elements boards are arranged on each of said elements boards along a side at an end of the elements board, and wirings for switching transmission, wirings for signal and wirings for voltage supply are connected to said electrodes at a portion along one side of the elements board.

16. A 2-dimensional radiation image detector according to any one of claims 1 to 4, wherein five or more unit 2-dimensional radiation image detectors each including said two elements boards arranged in an overlapping relationship with each other are joined in a plane with sides of the elements boards joined together to form said 2-dimensional radiation image detector having a total area equal to five times or more of the area of each of said unit 2-dimensional radiation image detectors.

17. A 2-dimensional radiation image detector according to any one of claims 1 to 4, wherein five or more unit 2-dimensional radiation image detectors each including said two elements boards arranged in an overlapping relationship with each other are joined in a plane with sides of the elements boards joined together to form said 2-dimensional radiation image detector having a total area equal to five times or more of the area of each of said unit 2-dimensional radiation image detectors such that the rectangular elements boards of at least one of said unit 2-dimensional radiation image detectors are joined at three of four sides thereof with the other three of said 2-dimensional radiation image detectors.

18. A 2-dimensional radiation image detector according to any one of claims 1 to 4, wherein electrodes for electric connection to the outside of said elements boards are arranged on each of said elements boards along a side at an end of the elements board, and wirings for switching transmission, wirings for signal and wirings for voltage supply are connected to said electrodes at a portion along one side of the elements board, and five or more unit 2-dimensional radiation image detectors each including said two elements boards arranged in an overlapping relationship with each other are joined such that the one of the four sides of each of the rectangular elements boards of each of said unit 2-dimensional radiation image detectors along which the electrodes for electric connection are arranged is not joined to any other of said unit 2-dimensional radiation image detectors.

19. A 2-dimensional radiation image detector according to any one of claims 1 to 4, wherein five or more unit 2-dimensional radiation image detectors each including said two elements boards arranged in an overlapping relationship with each other are joined in a plane with sides of the elements boards joined together to form said 2-dimensional radiation image detector having a total area equal to five times or more of the area of each of said unit 2-dimensional radiation image detectors such that the one of the four sides of each of the rectangular elements boards of each of said unit 2-dimensional radiation image detectors along which the electrodes for electric connection are arranged is not joined to any other of said unit 2-dimensional radiation image detectors.

20. A 2-dimensional radiation image detector according to any one of claims 1 to 4, wherein the belt has a width equal to the width of one of said photo-sensitive elements in the direction in which the distance between centers of said photo-sensitive elements is substantially equal to the width of said photo-sensitive elements.

21. A 2-dimensional radiation image detector according to any one of claims 1 to 4, wherein the belt has a width equal to the width of one of said photo-sensitive elements in the direction in which the distance between centers of said photo-sensitive elements is substantially equal to the width of said photo-sensitive elements; and wherein each of said conversion elements includes a phosphor board having grooves formed thereon which are filled up with a phosphor.

22. A 2-dimensional radiation image detector according to any one of claims 1 to 4, wherein the belt has a width equal to the width of one of said photo-sensitive elements in the direction in which the distance between centers of said photo-sensitive elements is substantially equal to the width of said photo-sensitive elements; and wherein each of said conversion elements includes a phosphor board having grooves formed thereon with a metal film of a high light reflection factor formed on the inner side of each of said grooves.

23. A 2-dimensional radiation image detector according to any one of claims 1 to 4, wherein the belt has a width equal to the width of one of said photo-sensitive elements in the direction in which the distance between centers of said photo-sensitive elements is substantially equal to the width of said photo-sensitive elements; and wherein each of said conversion elements includes a phosphor board having grooves formed thereon while a light intercepting film is formed on faces of said phosphor board other than said grooves.

24. A 2-dimensional radiation image detector according to any one of claims 1 to 4, wherein the belt has a width equal to the width of a plurality of ones of said photo-sensitive elements in the direction in which the distance between centers of said photo-sensitive elements is substantially equal to the width of said photo-sensitive elements; and wherein the belt has partitions formed therein at intervals substantially equal to the width of said photo-sensitive elements in a direction perpendicular to the direction of the belt.

25. A 2-dimensional radiation image detector according to any one of claims 1 to 4, wherein the belt has a width equal to the width of a plurality of ones of said photo-sensitive elements in the direction in which the distance between centers of said photo-sensitive elements is substantially equal to the width of said photo-sensitive elements;

wherein the belt has partitions formed therein at intervals substantially equal to the width of said photo-sensitive elements in a direction perpendicular to the direction of the belt; and wherein each of said conversion elements has a phosphor filled in recesses formed by partitioning the belt.

26. A 2-dimensional radiation image detector according to any one of claims 1 to 4, wherein the belt has a width equal to the width of a plurality of ones of said photo-sensitive elements in the direction in which the distance between centers of said photo-sensitive elements is substantially equal to the width of said photo-sensitive elements;

wherein the belt has partitions formed therein at intervals substantially equal to the width of said photo-sensitive elements in a direction perpendicular to the direction of the belt, the area of each of regions surrounded by the partitions of the belt being substantially equal to the area of each of said photo-sensitive elements.

27. A 2-dimensional radiation image detector according to any one of claims 1 to 4, wherein a first one of said elements boards has a thickness smaller than the thickness of a second one of said elements boards.

28. A 2-dimensional radiation image detector according to any one of claims 1 to 4, wherein said elements boards are made of glass or quartz.

29. A 2-dimensional radiation image detector according to any one of claims 1 to 4, wherein a first one of said elements boards has a two layer structure including first and second layers, and said photo-sensitive elements, a plurality of switching elements for reading out the signals accumulated in said photo-sensitive elements, wirings for signal, wirings for switching parallel control and wirings for voltage supply are formed on said first layer while said second layer is adhered to a rear face of said first layer.

30. A 2-dimensional radiation image detector according to any one of claims 1 to 4, wherein a first one of said elements boards has a two layer structure including first and second layers, and said photo-sensitive elements, a plurality of switching elements for reading out the signals accumulated in said photo-sensitive elements, wirings for signal, wirings for switching parallel control and wirings for voltage supply are formed on said first layer while said second layer is adhered to a rear face of said first layer, said first layer being made of glass or quartz.

31. A 2-dimensional radiation image detector according to any one of claims 1 to 4, wherein a first one of said elements boards has a two layer structure including first and second layers, and said photo-sensitive elements, a plurality of switching elements for reading out the signals accumulated in said photo-sensitive elements, wirings for signal, wirings for switching parallel control and wirings for voltage supply are formed on said first layer while said second layer is adhered to a rear face of said first layer, said first layer being made of a material whose average atomic number is lower than the average atomic number of elements of a material from which said second layer is formed.

32. A 2-dimensional radiation image detector according to any one of claims 1 to 4, wherein a first one of said elements boards has a two layer structure including first and second layers, and said photo-sensitive elements, a plurality of switching elements for reading out the signals accumulated in said photo-sensitive elements, wirings for signal, wirings for switching parallel control and wirings for voltage supply are formed on said first layer while said second layer is adhered to a rear face of said first layer, said second layer having grooves whose positions coincide with the positions of said conversion elements on a second one of said elements boards.

33. A 2-dimensional radiation image detector comprising:

a plurality of conversion elements for converting radiation into visible light;

a plurality of photo-sensitive elements for detecting the visible light and accumulating signals; and an elements board on which said conversion elements and said photo-sensitive elements are formed;

wherein said plurality of photo-sensitive elements are arranged two-dimensionally on said elements board such that the distance between centers of said photo-sensitive elements in one direction is substantially equal to the width of said photo-sensitive elements while the distance between the centers of said photo-sensitive elements in a direction perpendicular to the one direction is substantially equal to twice the width of said photo-sensitive elements; and wherein each of said conversion elements is in the form of a belt having a width equal to the width of at least one of said photo-sensitive elements in a direction in which the distance between centers of said photo-sensitive elements is substantially equal to the width of said photo-sensitive elements.

34. A 2-dimensional radiation image detector comprising:
a plurality of conversion elements for converting radiation into visible light;
a plurality of photo-sensitive elements for detecting the visible light and accumulating signals; and
an elements board on which said conversion elements and said photo-sensitive elements are formed;
wherein a phosphor film from which said conversion elements are formed has an area substantially one half the area of said elements board; and
wherein each of said conversion elements is in the form of a belt having a width equal to the width of at least one of said photo-sensitive elements in a direction in which the distance between centers of said photo-sensitive elements is substantially equal to the width of said photo-sensitive elements.

35. A 2-dimensional radiation image detector comprising:
a plurality of conversion elements for converting radiation into visible light;
a plurality of photo-sensitive elements for detecting the visible light and accumulating signals;
a plurality of switching elements for reading out the signals accumulated in said plurality of photo-sensitive elements; and
an elements board on which said conversion elements, said photo-sensitive elements and said switching elements are formed;
wherein a plurality of sets of detection pixels each including one of said photo-sensitive elements and one of said switching elements are arranged two-dimensionally on said element board;
wherein a region of a substantially one half area of each of said detection pixels on said elements board in a direction in which said photo-sensitive elements and said switching elements are arranged alternately is formed from a parallel wiring for switching control for controlling a corresponding one of said switching elements and a corresponding one of said photo-sensitive elements; and
wherein each of said conversion elements is in the form of a belt having a width equal to the width of at least one of said photo-sensitive elements in a direction in which the distance between centers of said photo-sensitive elements is substantially equal to the width of said photo-sensitive elements.

36. A 2-dimensional radiation image detector comprising:
a plurality of conversion elements for converting radiation into visible light;
a plurality of photo-sensitive elements for detecting the visible light and accumulating signals; and
an elements board on which said conversion elements and said photo-sensitive elements are formed;
wherein said 2-dimensional radiation image detector includes N elements boards arranged in an overlapping relationship with each other, N being an integer equal to or greater than 2, such that when radiation is directed upon said N elements boards, that portion of the radiation which has passed through an nth one of said elements boards other than said photo-sensitive elements is detected by said photo-sensitive elements on an (n+1)th one of said elements boards, n being an integer satisfying $1 \leq n < N$; and
wherein each of said conversion elements is in the form of a belt having a width equal to the width of at least one of said photo-sensitive elements in a direction in which the distance between centers of said photo-sensitive elements is substantially equal to the width of said photo-sensitive elements.

37. A 2-dimensional radiation image detector comprising:
a first elements board and a second elements boards arranged in an overlapping relationship with each other, each of the elements boards including
a plurality of conversion elements which convert radiation into visible light, and
a plurality of photo-sensitive elements which detect the visible light and accumulate signals,
the plurality of photo-sensitive elements being arranged in a first direction and a second direction perpendicular to the first direction;
wherein the distance between centers of adjacent ones of the photo-sensitive elements in the first direction is substantially equal to a width of the photo-sensitive elements in the second direction, and the distance between centers of adjacent ones of the photo-sensitive elements in the second direction is substantially equal to twice the width of the photo-sensitive elements in the second direction;
wherein each of the conversion elements is in the form of a belt in the first direction, the belt having a width equal to the width of the photo-sensitive elements in the second direction; and
wherein radiation passing through a portion other than locations of the photo-sensitive elements on the first elements board is converted by the conversion elements and detected by the photo-sensitive elements on the second elements board.

38. A two-dimensional radiation image detector comprising:
a first elements board and a second elements board arranged in an overlapping relationship with each other, each of the elements boards including
a plurality of conversion elements which convert radiation into visible light, and
a plurality of photo-sensitive elements which detect the visible light and accumulate signals,
the plurality of photo-sensitive elements being arranged in a first direction and a second direction perpendicular to the first direction;
wherein an area occupied by the conversion elements is approximately one-half of each of the elements boards;
wherein each of the conversion elements is in the form of a belt in the first direction, the belt having a width equal to the width of the photo-sensitive elements ln the second direction; and
wherein radiation passing through a portion other than locations of the photo-sensitive elements on the first elements board is converted by the conversion elements and detected by the photo-sensitive elements on the second elements board.

39. A two-dimensional radiation image detector comprising:
a first elements board and a second elements board arranged in an overlapping relationship with each other, each of the elements boards including
a plurality of conversion elements which convert radiation into visible light,
a plurality of photo-sensitive elements which detect the visible light and accumulate signals,
a plurality of switching elements which read out the signals accumulated in the plurality of photo-sensitive elements, and a plurality of detection pixels each including one of the photo-sensitive elements and one of the switching elements, the detection pixels being arranged in a first direction and a second direction perpendicular to the first direction on each of the elements boards;

wherein one of the photo-sensitive elements is formed in a region of a substantially one-half area of each of the detection pixels on each of the elements boards in the second direction in which the photo-sensitive elements and the switching elements are arranged alternately;

wherein each of the conversion elements is in the form of a belt in the first direction, the belt having a width equal to the width of the photo-sensitive elements in the second direction; and wherein radiation passing through a portion other than locations of the photo-sensitive elements on the first elements board is converted by the conversion elements and detected by the photo-sensitive elements on the second elements board.

40. A two-dimensional radiation image detector comprising:

a first elements board and a second elements board arranged in an overlapping relationship with each other, each of the elements boards including a plurality of conversion elements which convert radiation into visible light, and a plurality of photo-sensitive elements which detect the visible light and accumulate signals, the plurality of photo-sensitive elements being arranged in a first direction and a second direction perpendicular to the first direction;

wherein each of the conversion elements is in the form of a belt in the first direction, the belt having a width equal to the width of the photo-sensitive elements in the second direction; and wherein radiation passing through a portion other than locations of the photo-sensitive elements on the first elements board is converted by the conversion elements and detected by the photo-sensitive elements on the second elements board.

41. A two-dimensional radiation image detector according to claim 40, wherein two images obtained from the first elements board and the second elements board are joined together to form a single image which includes a number of pixels equal to twice a number of pixels of each of the two images.

42. A two-dimensional radiation image detector according to claim 40, wherein the first elements board and the second elements board are arranged in an overlapping relationship with each other such that the first elements board and the second elements board are displaced from each other in the second direction by a distance corresponding to the width of the photo-sensitive elements in the second direction.

43. A two-dimensional radiation image detector according to claim 40, wherein the photo-sensitive elements are photo-sensitive diodes made of amorphous silicon or poly-silicon.

44. A two-dimensional radiation image detector according to claim 40, further comprising a plurality of switching elements which read out the signals accumulated in the photo-sensitive elements;

wherein the plurality of switching elements are transistors made of amorphous silicon or poly-silicon.

45. A two-dimensional radiation image detector according to claim 40, further comprising:

a plurality of switching elements which read out the signals accumulated in the plurality of photo-sensitive elements; and parallel wirings for switching for controlling driving of the plurality of switching elements in parallel;

wherein parallel wirings are arranged on each of the elements boards and are wired in the second direction.

46. A two-dimensional radiation image detector according to claim 40, further comprising:

a plurality of switching elements which read out the signals accumulated in the plurality of photo-sensitive elements; and parallel wirings for switching for controlling driving of the plurality of switching elements in parallel;

wherein the parallel wirings are arranged on each of the elements boards and are wired in the second direction; and wherein the signals accumulated in the photo-sensitive elements are read out at a time in the second direction.

47. A two-dimensional radiation image detector according to claim 40, further comprising:

a plurality of switching elements which read out the signals accumulated in the plurality of photo-sensitive elements;

parallel wirings for switching for controlling driving of the plurality of switching elements in parallel; and wirings for switching transmission each of which connects each of the parallel wirings and a single end portion of each of the elements boards;

wherein the parallel wirings are arranged on each of the elements boards and are wired in the second direction; and wherein the wirings for switching transmission and the parallel wirings extend perpendicularly to each other.

48. A two-dimensional radiation image detector according to claim 40, further comprising:

a plurality of switching elements which read out the signals accumulated in the plurality of photo-sensitive elements; and wirings for signals for reading out the signals via the switching elements;

wherein the wirings for signals are wired in the first direction on each of the elements boards.

49. A two-dimensional radiation image detector according to claim 40, further comprising:

a plurality of switching elements which read out the signals accumulated in the plurality of photo-sensitive elements;

parallel wirings for switching for controlling driving of the plurality of switching elements in parallel;

wirings for signals for reading out the signals via the switching elements; and wirings for switching transmission each of which connects each of the parallel wirings and a single end portion of each of the elements boards;

wherein the parallel wirings are arranged on each of the elements boards and are wired in the first direction;

wherein the wirings for switching transmission and the parallel wirings extend perpendicularly to each other; and wherein the wirings for switching transmission and the wirings for signals are wired in parallel to each other in the first direction on each of the elements boards.

50. A two-dimensional radiation image detector according to claim 40, further comprising wirings for voltage supply each of which applies a voltage to each of the photo-sensitive elements on each of the elements boards and is wired in the first direction.

51. A two-dimensional radiation image detector according to claim 40, further comprising:
- a plurality of switching elements which read out the signals accumulated In the plurality of photo-sensitive elements;
- parallel wirings for switching for controlling driving of the plurality of switching elements in parallel;
- wirings for signals for reading out the signals via the switching elements;
- wirings for switching transmission each of which connects each of the parallel wirings and a single end portion of each of the elements boards;
- wirings for voltage supply each which applies a voltage to each of the photo-sensitive elements on each of the elements boards and is wired in the first direction; and
- electrodes for electrical connection to the outside of each of the elements boards;
- wherein the parallel wirings are arranged on each of the elements boards and are wired in the first direction;
- wherein the wirings for switching transmission and the parallel wirings extend perpendicularly to each other;
- wherein the wirings for switching transmission and the wirings for signals are wired in parallel to each other on each of the elements boards; and
- wherein the electrodes are arranged on each of elements boards, and the wirings for switching transmission, the wirings for signals, and the wirings for voltage supply are connected to the electrodes at portions along the single end portion of each of the elements boards.

52. A two-dimensional radiation image detector according to claim 40, further comprising a support having grooves;
- wherein the conversion elements are phosphor filled in the grooves.

53. A two-dimensional radiation image detector according to claim 40, further comprising a support having grooves;
- wherein the conversion elements are phosphor filled in the grooves; and
- wherein metal films having a high light reflection factor are formed on an inner side of each of the grooves.

54. A two-dimensional radiation image detector according to claim 40, further comprising a support having grooves;
- wherein the conversion elements are phosphor filled in the grooves; and
- wherein light intercepting films are formed on faces of the support other than the grooves.

55. A two-dimensional radiation image detector according to claim 40, further comprising a support having rectangular partitioned sections;
- wherein the conversion elements are phosphor filled in the rectangular partitioned sections; and
- wherein each of the rectangular partitioned sections is arranged at a position corresponding to a respective one of the photo-sensitive elements.

56. A two-dimensional radiation image detector according to claim 40, further comprising a support having rectangular partitioned sections;
- wherein the conversion elements are phosphor filled in the rectangular partitioned sections;
- wherein each of the rectangular partitioned sections is arranged at a position corresponding to a respective of the photo-sensitive elements; and
- wherein an area of each of the rectangular partitioned sections is substantially equal to an area of each of the photo-sensitive elements.

57. A two-dimensional radiation image detector according to claim 40, wherein a thickness of the first elements board is smaller than a thickness of the second elements board.

58. A two-dimensional radiation image detector according to claim 40, wherein each of the elements boards is made of glass or quartz.

59. A two-dimensional radiation image detector according to claim 40, further comprising a support board which maintains a strength of the first elements board.

60. A two-dimensional radiation image detector according to claim 40, further comprising a support board which maintains a strength of the first elements board;
- wherein the first elements board is made of glass or quartz.

61. A two-dimensional radiation image detector according to claim 40, further comprising a support board which maintains a strength of the first elements board;
- wherein an average atomic number of a material of which the support board is made is lower than an average atomic number of a material of which the first elements board is made.

62. A two-dimensional radiation image detector according to claim 40, further comprising a support board which maintains a strength of the first elements board and has grooves;
- wherein positions of the grooves of the support board coincide with positions of the conversion elements on the second elements board.

63. A two-dimensional radiation image detector according to claim 40, further comprising a support having grooves;
- wherein the conversion elements are phosphor filled in the grooves; and
- wherein a width of each of the grooves is substantially equal to the width of the belt in the second direction.

64. A two-dimensional radiation image detector according to claim 40, wherein the signals accumulated in the photo-sensitive elements on the first elements board and the second elements board are read out in parallel at a time.

65. A two-dimensional radiation image detector according to claim 40, wherein a first image obtained from the first elements board and a second image obtained from the second elements board are joined after signal levels of the first image and the second image are adjusted.

66. A two-dimensional radiation image detector comprising at least five unit two-dimensional radiation image detectors, each of the unit two-dimensional radiation image detectors including:
- a first rectangular elements board and a second rectangular elements board arranged in an overlapping relationship with each other, each of the rectangular elements boards including
  - a plurality of conversion elements which convert radiation into visible light,
  - a plurality of photo-sensitive elements which detect the visible light and accumulate signals,
  - the plurality of photo-sensitive elements being arranged in a first direction and a second direction perpendicular to the first direction;
- a plurality of switching elements which read out the signals accumulated in the plurality of photo-sensitive elements;
- parallel wirings for switching for controlling driving of the plurality of switching elements in parallel;
- wirings for signals for reading out the signals via the switching elements;
- wirings for switching transmission each of which connects each of the parallel wirings and a single end portion of each of the rectangular elements boards;

wirings for voltage supply each of which applies a voltage to each of the photo-sensitive elements on each of the rectangular elements boards and is wired in the first direction; and electrodes for electrical connection to the outside of each of the rectangular elements boards;

wherein each of the conversion elements is in the form of a belt in the first direction, the belt having a width equal to the width of the photo-sensitive elements in the second direction;

wherein radiation passing through a portion other than locations of the photo-sensitive elements on the first rectangular elements board is converted by the conversion elements and detected by the photo-sensitive elements on the second rectangular elements board;

wherein the parallel wirings are arranged on each of the rectangular elements boards and are wired in the first direction;

wherein the wirings for switching transmission and the parallel wirings extend perpendicularly to each other;

wherein the wirings for switching transmission and the wirings for signals are wired in parallel to each other on each of the rectangular elements boards;

wherein the electrodes are arranged on each of rectangular elements boards, and the wirings for switching transmission, the wirings for signals, and the wirings for voltage supply are connected to the electrodes at portions along the single end portion of each of the rectangular elements boards; and wherein at least five of the unit two-dimensional radiation image detectors are joined in a plane with sides other than the single end portion of each of the rectangular elements boards to form the two-dimensional radiation image detector having a total area equal to at least five times the area of each of the unit two-dimensional radiation image detectors.

67. A two-dimensional radiation image detector according to claim 66, wherein the rectangular elements boards of at least one of the unit two-dimensional radiation image detectors are joined at three sides of four sides thereof with three other ones of the unit two-dimensional radiation image detectors.

68. A two-dimensional radiation image detector comprising:

N elements boards arranged in an overlapping relationship with each other, each of the elements boards including
- a plurality of conversion elements which convert radiation into visible light,
- a plurality of photo-sensitive elements which detect the visible light and accumulate signals,
- a plurality of switching elements which read out the signals accumulated in the plurality of photo-sensitive elements, and
- a plurality of detection pixels each including one of the photo-sensitive elements and one of the switching elements,
- the detection pixels being arranged in a first direction and a second direction perpendicular to the first direction on each of the elements boards;

wherein a width of each of the detection pixels in the second direction is equal to N times a width of each of the detection pixels in the first direction;

wherein an area of each of the photo-sensitive elements is equal to one-Nth the area of each of the detection pixels;

wherein each of the conversion elements is in the form of a belt in the first direction, the belt having a width equal to the width of the photo-sensitive elements in the second direction;

wherein the elements boards are arranged in an overlapping relationship with each other such that the elements boards are displaced from each other by a distance equal to one-Nth the length of the detection pixels in the second direction;

wherein radiation passing through a first to an (N−1)th elements boards is converted by the conversion elements and detected by the photo-sensitive elements on an Nth elements board, N being an integer satisfying $2 \leq N$; and wherein N images obtained from the N elements boards are joined together to form a single image.

69. A two-dimensional radiation image detector comprising:

a first elements board and a second elements board arranged in an overlapping relationship with each other; and a single phosphor film disposed between the first elements board and the second elements board and converting radiation into visible light;

wherein each of the elements boards includes
- a plurality of photo-sensitive elements which detect the visible light and accumulate signals,
- the plurality of photo-sensitive elements being arranged in a first direction and a second direction perpendicular to the first direction;

wherein the single phosphor film is disposed such that the photo-sensitive elements on the first elements board and the second elements board are opposed to opposite faces of the single phosphor film; and wherein radiation passing through a portion other than locations of the photo-sensitive elements on the first elements board is converted by the conversion elements and detected by the photo-sensitive elements on the second elements board.

* * * * *